United States Patent [19]

Kimata

[11] Patent Number: 5,600,127
[45] Date of Patent: Feb. 4, 1997

[54] SOLID STATE IMAGE SENSOR TRANSFERRING CHARGES WITH HIGH EFFICIENCY AND DECREASED POWER CONSUMPTION, AND METHOD OF DRIVING THE SAME

[75] Inventor: Masafumi Kimata, Amagasaki, Japan

[73] Assignee: Mitsubishi Denki Kabushiki Kaisha, Tokyo, Japan

[21] Appl. No.: 508,430

[22] Filed: Jul. 31, 1995

[30] Foreign Application Priority Data

Feb. 23, 1995 [JP] Japan ................................. 7-035126

[51] Int. Cl.⁶ ................................................. H01J 40/14
[52] U.S. Cl. ......................................... 250/208.1; 348/303
[58] Field of Search .......................... 250/208.1; 348/303, 348/304, 308, 283; 257/231, 232; 377/34, 44, 115-117

[56] References Cited

U.S. PATENT DOCUMENTS

| | | | |
|---|---|---|---|
| 4,577,233 | 3/1986 | Kimata | 348/308 |
| 4,581,539 | 4/1986 | Kimata | 348/322 |
| 5,194,724 | 3/1993 | Sekine | 250/208.1 |
| 5,229,857 | 7/1993 | Taniji | 348/312 |

OTHER PUBLICATIONS

Masafumi Kimata et al, A 512×512–Element PtSi Schottky–Barrier Infrared Image Sensor, IEEE Journal of Solid–State Circuits, vol. SC–22, No. 6, Dec. 1987, pp. 1124–1129.

Masafumi Kimata et al, High Density Schottky–Barrier Infrared Image Sensor, Proceedings, SPIE vol. 930, Infrared Detectors and Arrays, Jan. 1988, pp. 11–25.

Primary Examiner—Que T. Le
Attorney, Agent, or Firm—Lowe, Price, LeBlanc & Becker

[57] ABSTRACT

A solid state image sensor of charge sweep architecture comprises photodetectors in two-dimension, vertical charge transfer elements and a horizontal charge transfer element. A driver circuit for the vertical charge transfer elements mounted in the solid state image sensor comprises a circuit for setting initial states of shift registers and a circulation loop line connecting an output of the shift register at the last stage to an input of the shift register at a first stage. Thus, a lower consumption power and high efficiency charge transfer are provided in the solid state image sensor.

20 Claims, 13 Drawing Sheets

SOLID STATE IMAGE SENSOR TRANSFERRING CHARGES WITH HIGH EFFICIENCY AND DECREASED POWER CONSUMPTION, AND METHOD OF DRIVING THE SAME

BACKGROUND OF THE INVENTION

1. Field of the Invention

The present invention relates to a solid state image sensor wherein a photodetector array including photodetectors are arranged in two-dimension,.and a driving method therefor, or in particular, to a driving circuit of the sensor and a driving method therefor.

2. Description of the Prior Art

A solid state image sensor of charge sweep device (CSD) architecture comprises a two-dimensional photodetector array, vertical charge transfer elements each connected through transfer gates to a vertical line of the photodetectors, a pixel line selector for selecting one of transfer gates for a vertical line, and a horizontal charge transfer element (horizontal CCD) connected to the vertical charge transfer element through a storage gate and a storage control gate. A pixel line selector supplies a signal for designating a horizontal line to the transfer gates, and the signal charge in a photodetector is transferred by a transfer gate to the vertical charge transfer element. The vertical charge transfer element comprises gate electrodes in correspondence to horizontal lines, and a driving circuit supplying driving clocks to the gates to transfer the signal charge successively along the vertical charge transfer element. The storage gate stores temporarily the signal charge transferred from the vertical charge transfer element, and the storage control gate controls the signal charge transfer from the storage gate to the horizontal CCD. The solid state image sensor of charge sweep device (CSD) architecture is disclosed in M. Kimata, U.S. Pat. No. 4,581,539 and M. Kimata, U.S. Pat. No. 4,577,233. The structure and operation of the charge sweep device is also explained in M. Kimata, M. Denda, N. Yutani, S. Iwade and N. Tsubouchi, IEEE Journal of Solid State Circuits, Vol. SC-22, 1124–1129 (1987), and M. Kimata, M. Denda, N. Yutani, S. Iwade and N. Tsubouchi, Proceedings of SPIE, 930, 11–25 (1988).

It is known that the transfer gates and the gate electrodes are constructed as common electrodes. The driving of the vertical charge transfer elements is also possible with examples different from the above-mentioned one, or the pixel line selection may adopt interlace scan.

The driving circuit for the vertical charge transfer elements may comprise shift registers. However, the driving circuit may use four-phase driving clock signals applied according to a driving pattern to each four successive gates. If such a driving circuit comprises shift registers, when input states of the driving pattern to the shift registers are turned on and off repeatedly, and the driving pattern changes for an output cycle for each pixel. Then, an input pattern for the shift registers are needed as external driving clock signals, and this generates noises of a fixed pattern in an image.

In order to remove the noises of a fixed pattern, when four-phase clock signals for the vertical charge transfer elements are generated in the solid state image sensor, the driving circuit uses external four-phase clock signals. In principle, it is possible to drive the vertical charge transfer elements directly by using the external clock signals without inverting to the internal clock signals. However, the number of the gates in the vertical charge transfer elements is very large, and if all the gates are driven directly, a circuit of very large driving ability is needed, while vertical charge transfer has to be carried out at a fast speed in a horizontal period. Therefore, the direct driving is impossible actually.

In the above-mentioned driving circuit using four-phase clock signals, noises due to a fixed pattern can be decreased. However, each output of the driving circuit has to generate clock signals of at least a number of the pixels aligned along the vertical direction divided by four, and the potentials of all the gates are changed at each clock cycle. This operation corresponds to charging or discharging of a large capacity at a fast rate, and the electric power consumed by the vertical charge transfer elements becomes very large.

In principle, it is possible to decease the consumption power without affecting other characteristics by changing the driving method for the vertical charge transfer elements from the above-mentioned four phases to a larger phases. However, because a number of clock signals supplied from the external increases due to the multi-phase driving, a number of electrical conduction lines connected to the external also increases, and they act as thermal sources or heat conduction means. Therefore, it is difficult to apply the multi-phase driving especially to a solid state image sensor for infrared rays which has to be cooled.

On the other hand, another driving method is proposed where a start signal of the shift registers is supplied from the external, and driving clock signals are generated successively after an start signal is received. Though an output signal has noises due to the start signal, the start signal is supplied only once per horizontal period, and it may be supplied in a horizontal blanking period. Therefore, the noises due to the start signal are not a problem on an image.

In the above-mentioned driving method, a number of lines which can be charged or discharged at each clock cycle without increasing a number of necessary external clock signals is always one, and a consumption power can be decreased. However, the driving method has a problem that the transfer efficiency decreased because the signal charge disperses in the vertical charge transfer element.

In the vertical charge transfer of the prior art solid state image sensor of CSD architecture explained above, a low consumption power of the sensor and high efficiency of charge transfer cannot be realized at the same time.

SUMMARY OF THE INVENTION

An object of the present invention is to provide a solid state image sensor of charge sweep device architecture and a driving method therefor which can transfer charges with high efficiency and decrease a consumption power without increasing noises.

Another object of the present invention is to provide a solid state image sensor including a driving circuit for vertical charge transfer elements which comprises shift registers and can drive the shift registers as multi-phase driving substantially with use of a small number of external clock signals without receiving a pattern from the external.

In one aspect of the invention, a solid state image sensor comprises: a photodetector array wherein photodetectors are arranged in two-dimension vertically and horizontally; vertical charge transfer elements each connected to a line of photodetectors aligned vertically in the photodetector array; a pixel line selection circuit which selects a horizontal line or a group of horizontal lines of photodetectors among the photodetectors in a horizontal blanking period and transfers signal charges stored in the photodetectors in the selected line or lines to the vertical charge transfer elements; a driver means for supplying signals to the vertical charge transfer elements for driving the signal charges in the vertical charge transfer elements; and a horizontal charge transfer element connected to the vertical charge transfer elements, the horizontal charge transfer element transferring signal charges transferred from the vertical charge transfer elements to the external in a next horizontal period subsequent to the horizontal blanking period. The driver circuit comprises shift registers of a plurality of stages each corresponding to a horizontal line of the photodetector array. Each stage of the shift transistors comprises: transfer gates operated by clock signals and inverters connected to the transfer gates; connection lines connecting an output of the shift register in a stage to an input of the shift register in a next stage; and a circulation loop line connecting an output of the shift registers of the last stage in the shift registers to an input of the shift register of a first stage in the shift registers.

In a second aspect, the driver circuit comprises shift registers of a plurality of stages each corresponding to a horizontal line of the photodetector array. Each stage of the shift transistors comprises: transfer gates operated by clock signals and inverters connected to the transfer gates; and a means for generating clock signals for driving the vertical charge transfer elements, the clock signals having a number necessary to read signal charges stored in two-dimension in a horizontal period, the number being at least twice a number of the photodetectors arranged vertically.

An advantage of the present invention is that the solid state image sensor of charge sweep device architecture can transfer charges with high efficiency and decrease a consumption power without increasing noises.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
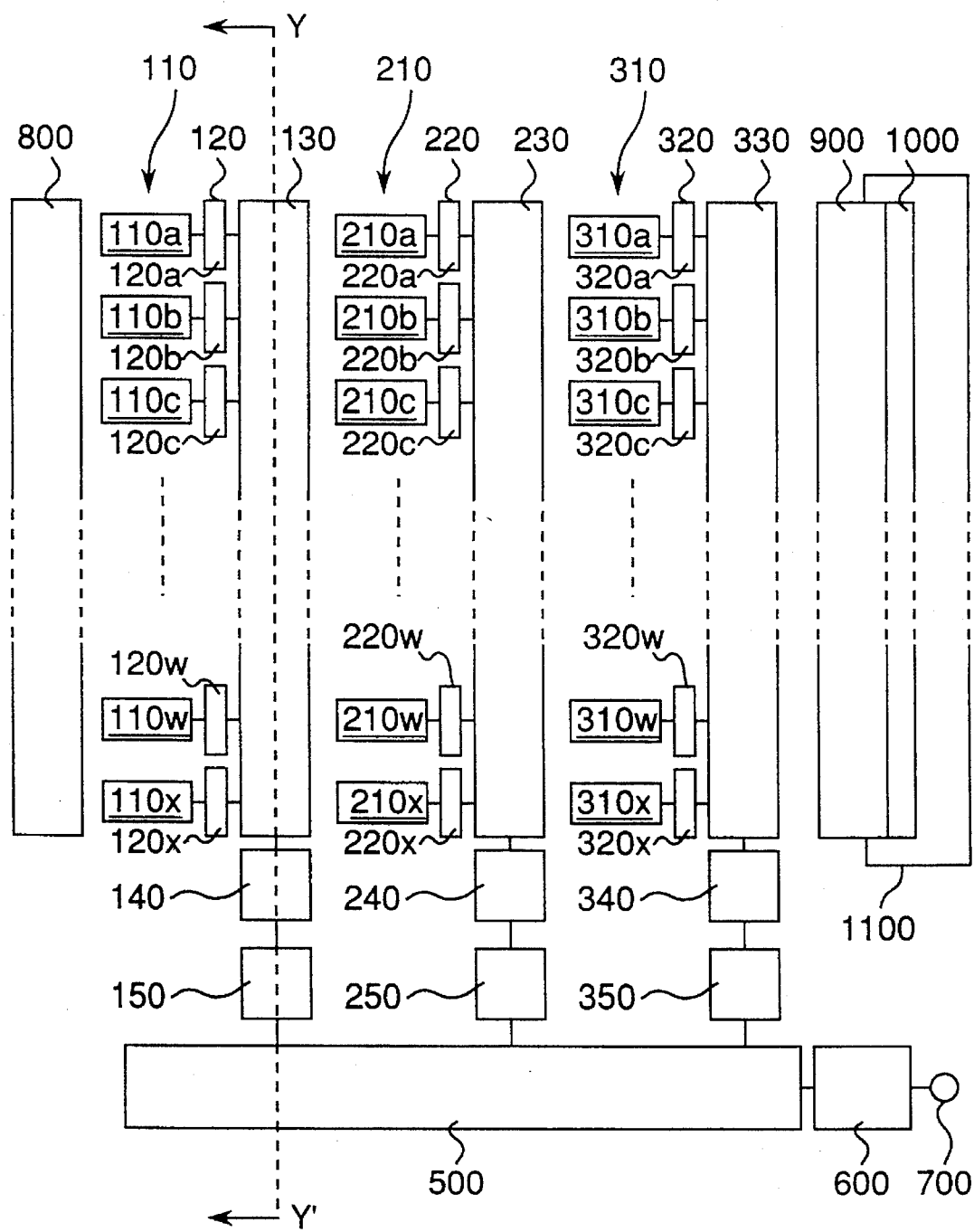
FIG. 1 is a block diagram of a vertical charge transfer element and a driving circuit therefor of a solid state image sensor of a first embodiment of the invention.

Referring now to the drawings, wherein like reference characters designate like or corresponding parts throughout the views, embodiments of the invention will be explained.
Embodiment 1

A solid state image sensor of a first embodiment of the present invention will be explained below with reference to FIGS. 1–5. The solid state image sensor comprises vertical charge transfer elements (vertical CCD). The vertical CCD is, for example, a device using a surface channel, wherein electrodes are arranged on a thin oxide film formed on a p-type semiconductor. A potential well is generated in the semiconductor just below the electrode by applying a positive electric potential to an electrode to store electrons as minority carriers in the potential well. Charges are transferred by applying a positive potential to a next electrode to move the potential well. Thus, the charges are transferred successively. In modified examples, the vertical CCD is a buried channel CCD wherein an n-type well is formed in a p-type semiconductor, and electrons as majority carriers can be transferred through the n-type well.

Figure 2:
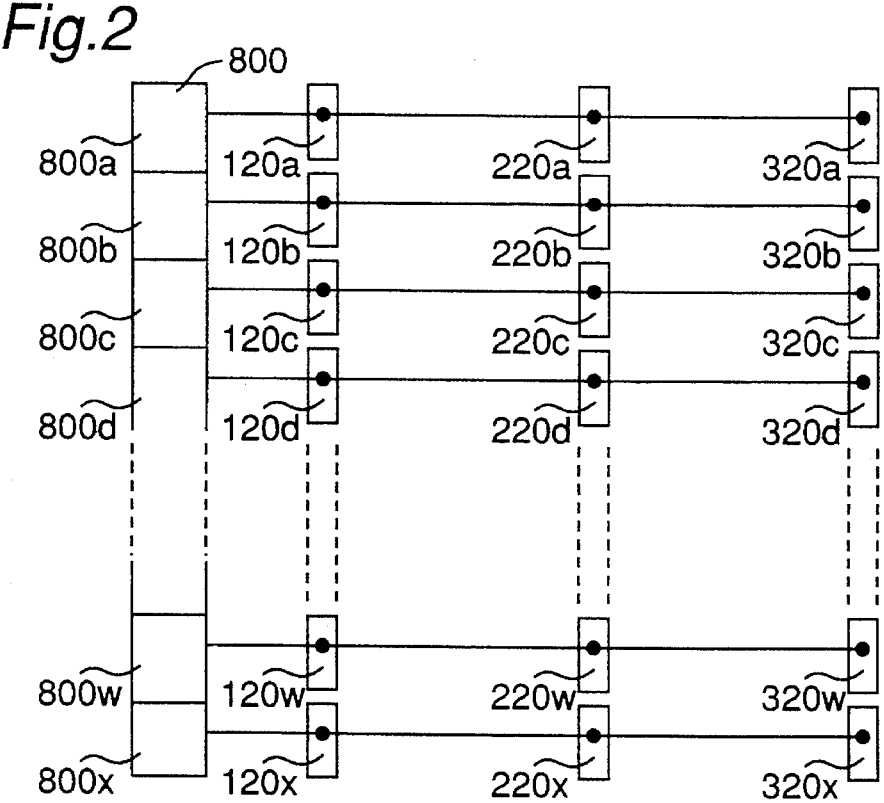
FIG. 2 is a diagram illustrating connection between a pixel line selection circuit and a transfer gate of the solid state image sensor of the invention.
Figure 3:
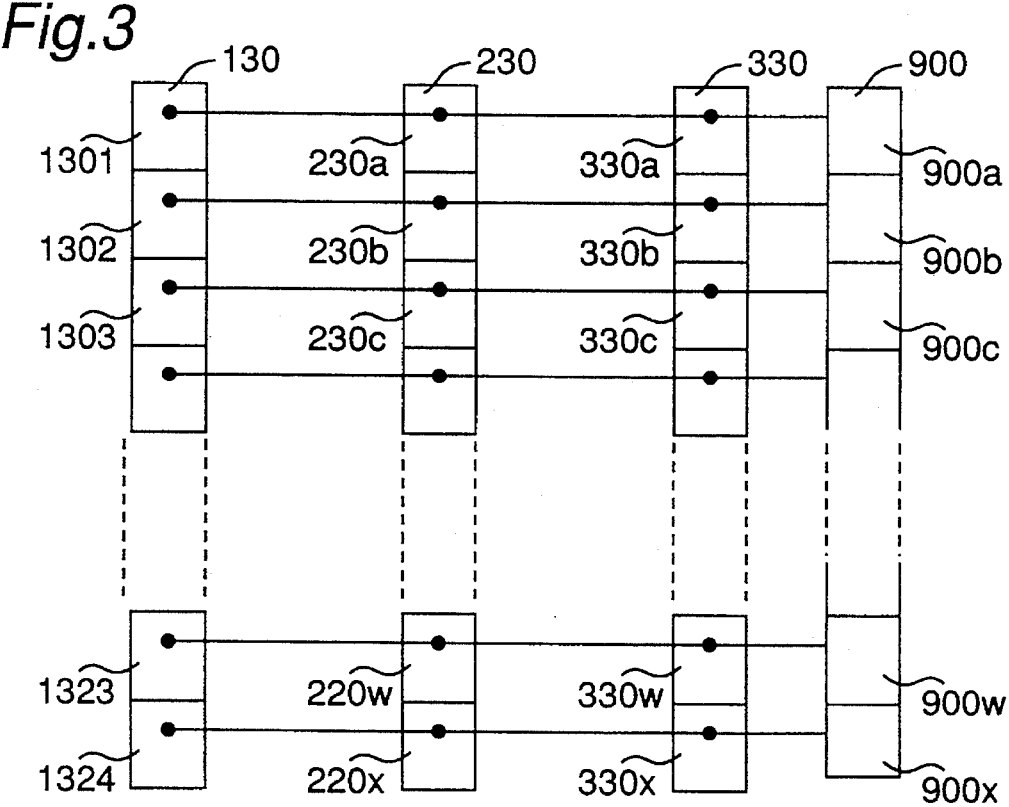
FIG. 3 is a diagram illustrating connection between a driving circuit for a vertical charge transfer element and a gate electrode thereof of the solid state image sensor of the invention.

FIG. 1 shows a block diagram of the solid state image sensor-wherein photodetectors 110a–110x, 210a–210x, 310a–310x are arranged in two-dimension vertically and horizontally. In FIG. 1, a number or pixels or photodetectors along the horizontal direction is three, while that along the vertical direction is twenty four for the simplicity of explanation. However, the numbers are actually about several hundreds, and the photosensor array comprises for example 512*512 pixels. Each vertical line of the photodetectors 110a–110x, 210a–210x, or 310a–310x is connected through transfer gates 120a–120x, 220a–220x, or 320a–320x to a vertical charge transfer elements 130, 230 or 330. A signal charge q is transferred from the photodetector 110a–110x, 210a–210x, 310a–310x to the vertical charge transfer element 130, 230, 330 by the transfer gate 120a–120x, 220a–220x, 320a–320x which controls the charge transfer. The signal charge transferred in the vertical charge transfer element (vertical CCD) 130, 230, 330 is stored temporarily in a storage gate 140, 240, 340, and transferred to a horizontal charge transfer element (horizontal CCD) 500 under the control of a storage control gate 150, 250, 350. A preamplifier 600 generates a voltage signal according to the amount of the signal charge output from the horizontal charge transfer element 500, and the voltage signal is sent to the external 700. A pixel line selection circuit 800 (represented in FIG. 2 as 800a–800x for each stage) comprises shift registers, and FIG. 2 shows connection between the pixel line selection circuit 800 and transfer gates 120a–120x, 220a–220x, 320a–320x. That is, a stage, say 800a, of the pixel line selection circuit 800 is connected to the transfer gates 120a, 220a and 320a along a horizontal line. A driving circuit 900 (represented in FIG. 3 as 900a–900x for each stage) for the vertical charge transfer elements 130, 230, 330 supplies driving clock signals to each gate electrode of the vertical charge transfer element 130, 230, 330, and FIG. 3 shows connection between a driving circuit 900 for the vertical charge transfer elements 130, 230, 330 and the gate electrodes thereof 130a–130x, 230a–230x, 330a–330x. That is, a stage, say 900a, of the driving circuit 900 is connected to the gate electrodes 130a, 230a and 330a along a horizontal line. Gate electrodes of the vertical charge transfer element 230, 330 are denoted as 230a–230x, 330a–330x. Some reference signals are omitted in the drawings for the ease of explanation.

Figure 4:
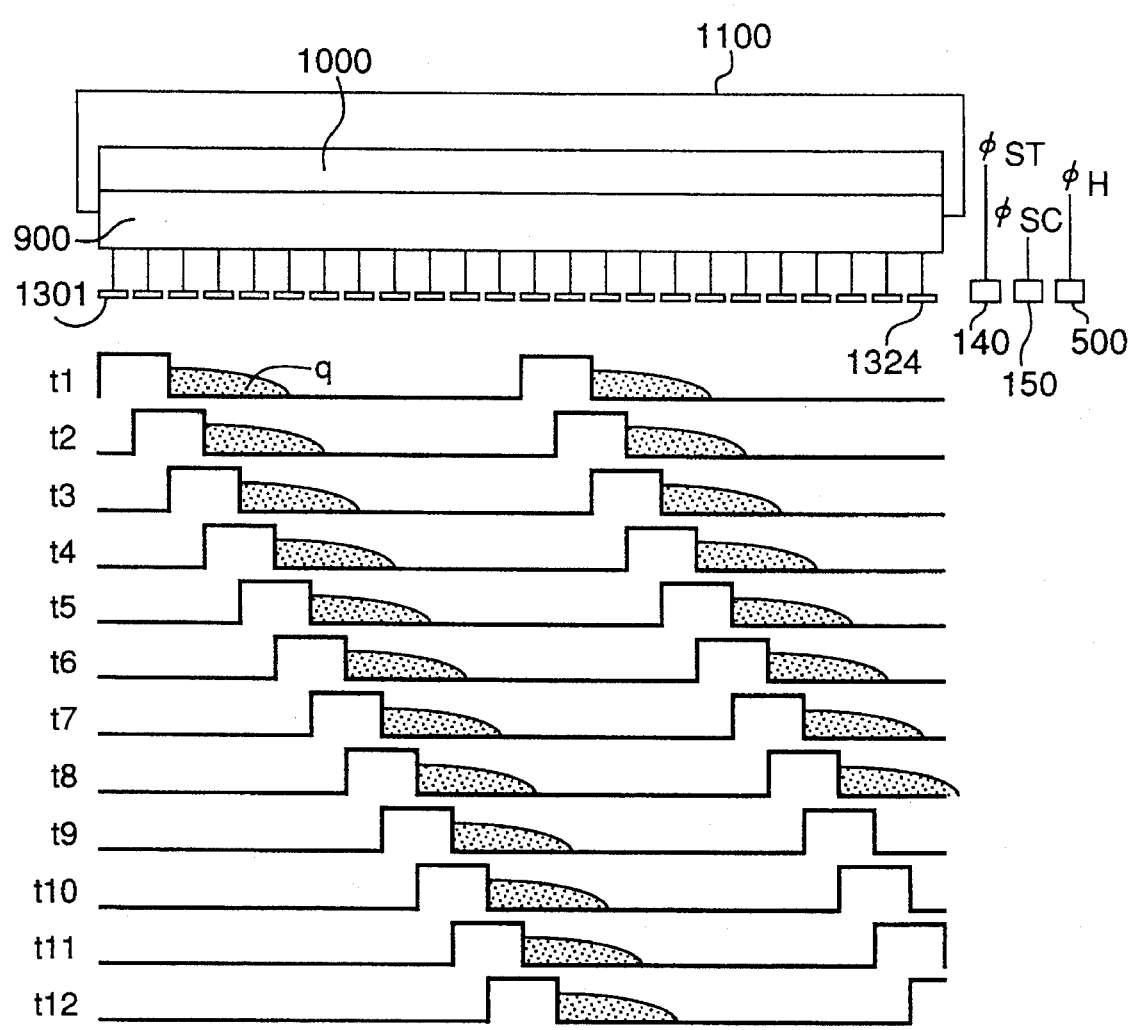
FIG. 4 is a channel potential diagram in the vertical charge transfer element of the solid state image sensor at each timing.
Figure 5:
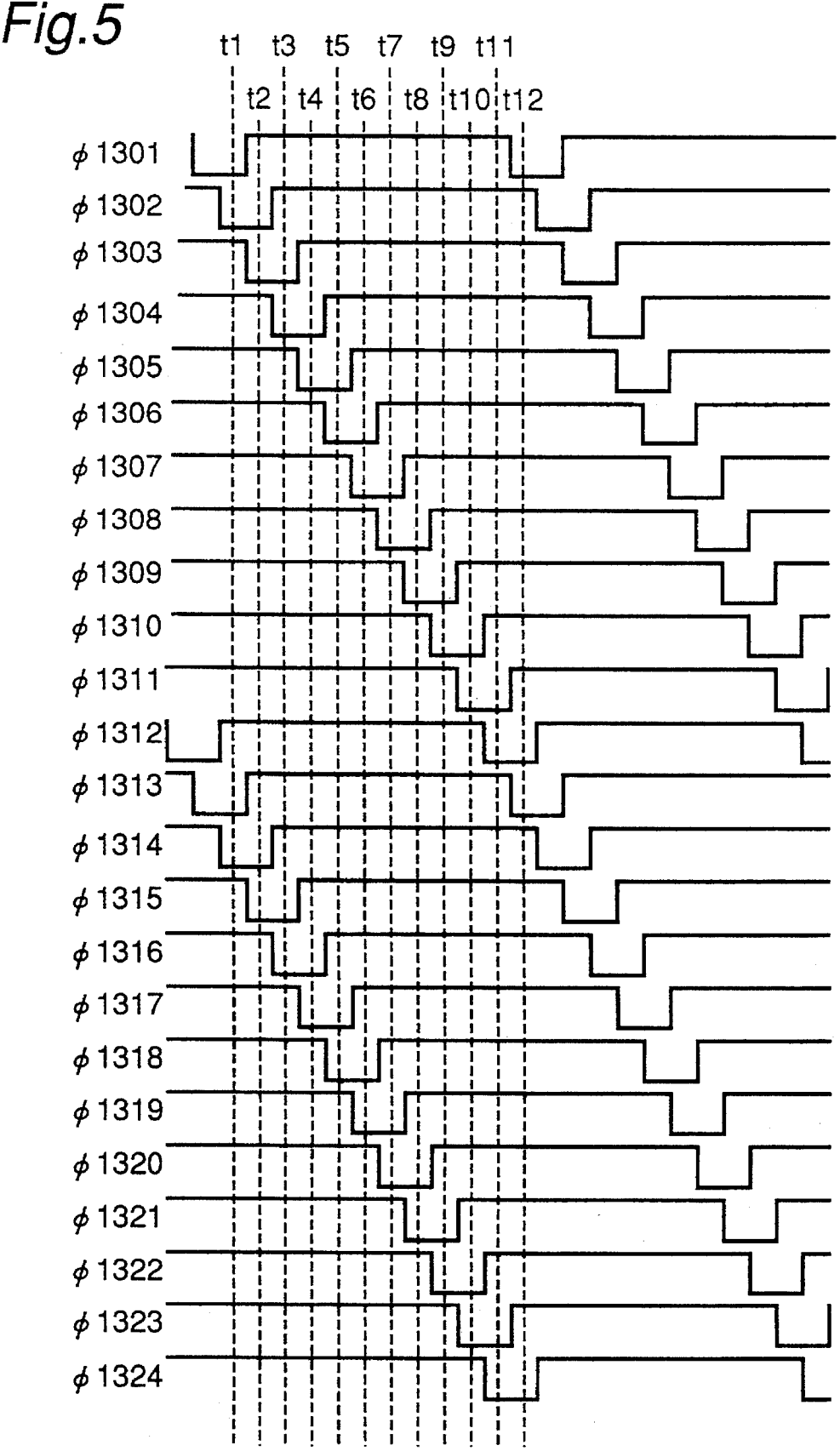
FIG. 5 is a clock timing chart of clocks generated by the driving circuit shown in FIG. 4.

FIG. 4 shows a structure of the image sensor including the gate electrodes 1301–1324 of the vertical charge transfer element and the driving circuit 900, and it also shows a potential channel diagram in the vertical charge transfer element at each timing, wherein potential states are shown along Y–Y' section in FIG. 1. A circuit 1000 sets an initial state on driving of the driving circuit 900 comprising shift registers. An output of a last stage of the driving circuit 900 for the vertical charge transfer element is connected to an input thereof by a circulation loop line 1100. In the example explained here, the number of pixels along a vertical direction is twenty four, and the twenty four gate electrodes 1301–1324 of the vertical charge transfer element 130 is arranged along the vertical direction. As shown in FIG. 5 of the clock timing chart of clocks generated by the driving circuit 900 shown in FIG. 4, clocks $\phi1301$–$\phi1324$ are applied to the gate electrodes 1301–1324 at timings of t1–t12.

Figure 6:
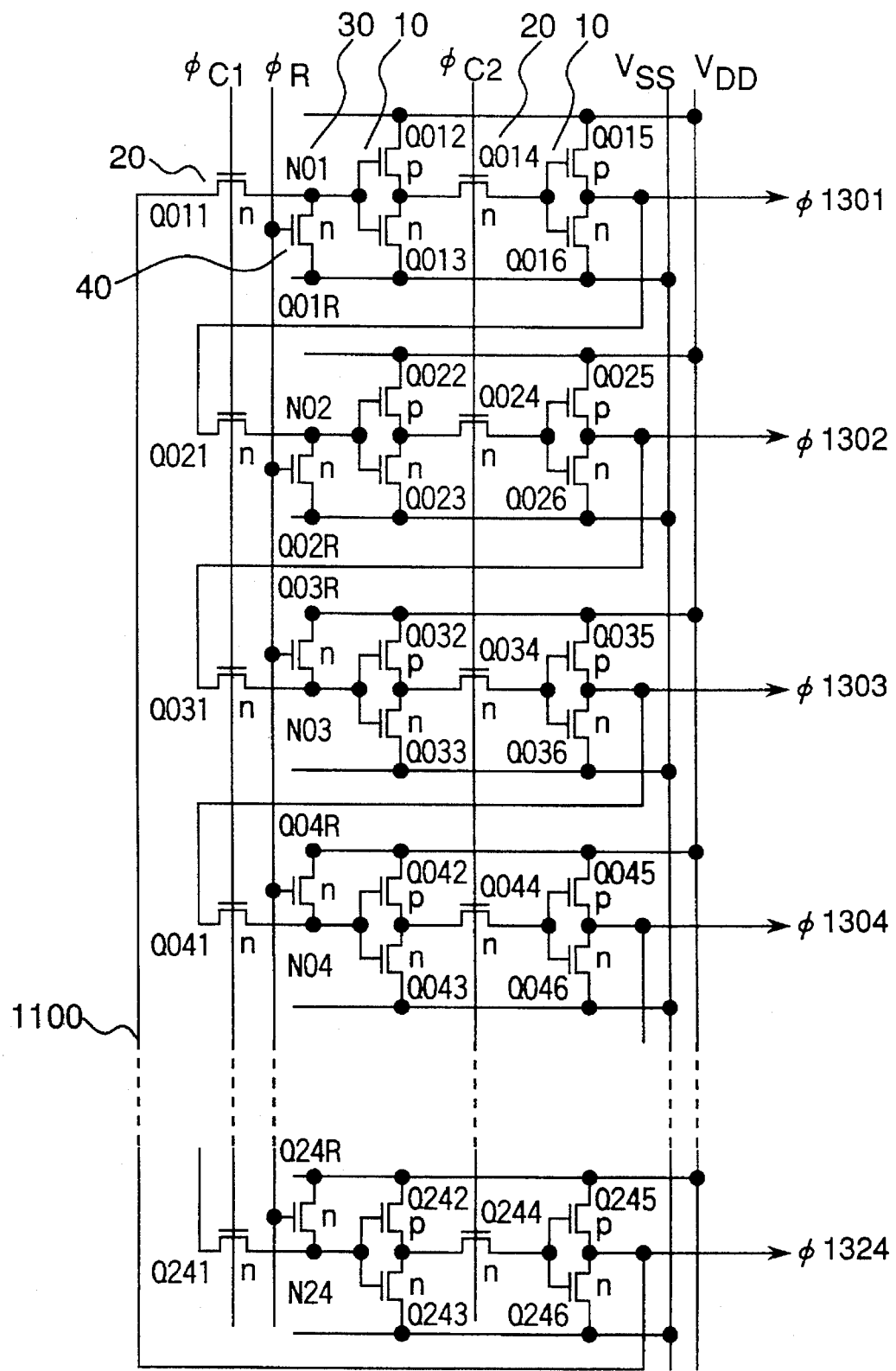
FIG. 6 is circuit diagram of a driving circuit for vertical charge transfer elements in the solid state image sensor.

FIG. 6 shows mainly the driving circuit 900 for the vertical charge transfer element and the circuit 1000 for setting initial state of the driving circuit. The circulation loop line 1100 is connected to the driving circuit 900. The driving circuit 900 comprises shift registers comprising CMOS transistors. In FIG. 6, each stage of shift registers in the driving circuit 900 comprises two CMOS inverters 10 and a transfer gate 20 to which two non-overlapping clocks $\phi_{C1}$ and $\phi_{C2}$ are applied. (Reference signs "p" and "n" represent pMOS and nMOS transistors, respectively, in FIG. 6 and other drawings explained later.) For example, in the first stage, the shift register comprises CMOS inverters Q012, Q013, other CMOS inverters Q015, Q016 and a transfer gate Q011, Q014. On the other hand, the circuit 1000 for setting initial state of the driving circuit comprises a reset transistor 40 (for example, Q01R in the first stage) which resets a node 30 (for example, N01 in the first stage), provided after the first transfer gate 20 in each stage, at a prescribed voltage (ground potential $V_{SS}$ or positive power supply voltage $V_{DD}$) at a prescribed clock signal $\phi_R$. For example, in the first stage, the circuit 1000 for setting initial state comprises a transistor Q01R which resets the node N01. It is to be noted that connection lines connect an output of the shift register in a stage to an input of the shift register in a next or subsequent stage, while the circulation loop line 1100 connects an output of the last stage of the stages to an input of a first stage. The outputs of the shift registers are used as driving clock signals $\phi1301$–$\phi1324$. Though not shown in FIG. 6, reset transistors 40 are arranged as explained below.

In the driving circuit where two successive stages have different potentials from each other, and a pattern of the potentials is sent to a next stage by generating clock signals $\phi1313$, $\phi1314$ as shown in FIG. 5, the connection of the reset transistors are similar to that generating clock signals $\phi1301$, $\phi1302$, or the input node 30 is connected to $V_{SS}$ on resetting, while the input nodes 30 are connected to $V_{DD}$ on resetting in the other stages.

Next, the operation of the solid state image sensor of the embodiment is explained. First, at least when an electric power source is turned on, input stages of the shift registers of the driving circuit are reset by supplying $\phi_R$. At this time, signals $\phi_{C1}$ and $\phi_{C2}$ are at L levels, while the transfer gate 10 is in the OFF state. In this state, the input nodes N01, N02, N13, and N14 in the first, second, 13-th and 14-th stages are set at the ground potential ($V_{SS}$), and the ground potential is sent to the first inverter 10. Then, because the source electrode of the pMOS transistor of the first inverter 10 has a level of $V_{DD}$ and the source electrode of the nMOS transistor of the first inverter 10 has a level of $V_{SS}$, the pMOS transistor of the first inverter 10 in each of the first, second, 13-th and 14-th stages is turned on, and the output of each first inverter 10 has a level of $V_{DD}$. Next, when signal $\phi_{C1}$ becomes H level to turn on the second transfer gate 20, the output ($V_{DD}$) of the first inverter 10 is sent to the second inverter 20 in each stage. Then, because the source electrode of the pMOS transistor of the second inverter 20 has a level of $V_{DD}$ and the source electrode of the nMOS transistor of the second inverter 20 has a level of $V_{SS}$, the nMOS transistor of the second inverter 20 is turned on, and the output of the second inverter 20 has a level of $V_{SS}$. That is, output signals $\phi1301$, $\phi1302$, $\phi1313$ and $\phi1314$ become $V_{SS}$ level.

Next, the operation in the other stages except the first, second, 13-th and 14-th stages is explained on the third stage as a representative example. First, when an electric power source is turned on, input stages of the shift registers are reset by supplying $\phi_R$. At this time, signals $\phi_{C1}$ and $\phi_{C2}$ are at L levels, while the transfer gate 10 is in the OFF state. In this state, the input node N03 in the third stage is set at the positive power supply potential ($V_{DD}$) which is sent to the first inverter 10. Then, because the source electrode of the pMOS transistor of the first inverter 10 has a level of $V_{DD}$ and the source electrode of the nMOS transistor of the first inverter 10 has a level of $V_{SS}$, the nMOS transistor in the first inverter 10 is turned on, and the output of the first inverter 10 has a level of $V_{SS}$. Next, when signal $\phi_{C2}$ becomes H level to turn on the second transfer gate 20 (Q034), the output ($V_{SS}$) of the first inverter 10 is sent to the second inverter 20. Then, because the source electrode of the pMOS transistor of the second inverter 20 has a level of $V_{DD}$ and the source electrode of the nMOS transistor of the second inverter 20 has a level of $V_{SS}$, the pMOS transistor (D035) of the second inverter 20 is turned on, and the output of the second inverter 20 has a level of $V_{DD}$. That is, signal $\phi1303$ becomes $V_{DD}$ level.

The above-mentioned operation is performed at a timing t1 shown in FIG. 5 realizes a clock state. Then, when $\phi_{C1}$ becomes H level to turn on the first transfer gate 10, an output of each stage is sent to an input terminal of the first inverter 10 of a next stage. For example, an output $\phi1324$ of the last stage is sent through the circulation loop line 1100 to an input terminal of the first inverter 10 of the first stage. At this state, the input nodes N02, N03, N14, N15 of the first inverter 10 receive $V_{SS}$ level, while the input nodes of the other stages receive $V_{DD}$ level. That is, the initial states explained above at the timing t1 are shifted by one stage.

Then, in the third stage, the input node N3 receives $V_{SS}$ level, and the pMOS transistor (Q032) is turned on in the first inverter 10 to output $V_{DD}$ level. Next, when $\phi_{C2}$ becomes H level, the second inverter receives $V_{DD}$ level to turn on the nMOS transistor (Q036) to output $V_{SS}$ level. That is, outputs signals $\phi1302$, $\phi1303$, $\phi1314$ and $\phi1315$ become $V_{SS}$ level, while output signals of the other stages become $V_{DD}$ level. The above-mentioned operation realizes a clock state at the timing t2 shown in FIG. 5. By repeating the above-mentioned operation, each time $\phi_{C2}$ becomes H level, the outputs of $V_{SS}$ shift by one stage, to generate clock signals as shown in FIG. 5. In the other stages, the input nodes N03–N12, N15–N24 become $V_{DD}$ level, and the output of the first inverter 10 in these stages becomes $V_{SS}$ level.

Clocks shown in FIG. 5 generate potential states shown at t1–t12 in FIG. 4, and signal charges are transferred from left to right in FIG. 4.

In the above-mentioned example, the driving circuit 900 supplies clock signals of twelve phases substantially. In the case, when signal charges are transferred to the right side by one gate in the vertical charge transfer element 130, 230, 330 of twenty four stages, clock voltages of the only four gates are changed. On the contrary, when the prior art four phase driving scheme is applied to a vertical charge transfer element of twenty four stages, Clocks applied to twelve gates or to a half of all the gates have to be changed for transfer by one gate. Then, a capacity to be charged and discharged becomes three times that of the embodiment on transfer by the same distance, so that consumption power increases three times that of the invention at the same driving voltage. If a number of shift registers driven at a clock timing relative to the total number of the shift registers becomes smaller, as in the invention, or if a number of shift registers to be driven becomes smaller, the consumption power can be decreased. Then, it is preferable that a number of shift registers having an output of H level is larger than that of those having an output of L level or that a number of shift registers driven is smaller than a half of the total number thereof.

The embodiment shows an example of twelve-phase driving. However, it is easy to realize a multi-phase driving for the vertical charge transfer elements with a larger number of phases by changing the design of the circuit for setting initial state of driving for the vertical charge transfer element, and the consumption power can be decreased more by increasing the number of phases. The design can be changed simply, for example, by changing connection of the reset transistors 40 (Q01R–Q24R in FIG. 6) to desired voltages.

The above-mentioned operation is also advantageous to increase a maximum amount of transferred charge by increasing a ratio of a signal storage area in the vertical charge transfer element. The signal storage area corresponds to an area of a low level portion enclosed by a high level portion shown in the potential diagram of FIG. 4, or to an area (width) of the well. Then, if the driving is performed with multi-phase driving clock signals, and an output change of the shift register at each stage is small, as in the embodiment, the area becomes larger. On the other hand, the potential well is defined by twelve phases, and the charge is confined in the width of the well, so that it does not distribute over all the elements arranged vertically, as in a prior art element, and a problem on the decrease in charge transfer efficiency is solved. Further, the potential well is defined by clock signals of two stages in the embodiment, but when clock signal is changed, a potential barrier can be formed sufficiently by using at least two stages.

In the above-mentioned embodiment, the number of H-level outputs interposed between L-level inputs is set to be the same. However, the consumption power can be decreased when the number is not the same.

In the embodiment, because the circuit 1000 for setting initial state of the vertical charge transfer element and the circulation loop line 1100 are provided, it is not needed to provide a driving pattern from the external. In the driving, a number of internal clock signals which change states is the same at each timing, fixed pattern noises are not generated due to a combination of outputs with clock signals.

In the embodiment, a number of input signals of clocks $\phi_{C1}$, $\phi_{C2}$, $\phi_R$ and electric power sources $V_{DD}$ and $V_{SS}$ necessary for the operation is five, which is smaller by one than that of the prior art four-phase driving method. This is favorable on the structure,.operation (cooling, stability and the like) and cost of the image sensor.

In the embodiment, each stage is constructed by the same circuit. However, a driving load of the second inverter in the last stage includes the vertical charge transfer element and the circulation loop line 1100, a load capacity becomes large. The operation as the shift register can be stabilized by increasing the channel width of the transistor of the second inverter in the last stage or by providing a buffer between the inverter and the circulation loop line 1100.

In the embodiment, the driving circuit for the vertical charge transfer element is reset when an electric power source is turned on. The reset is performed at least when an electric power source is turned on. It is also possible to reset for each horizontal and vertical blanking period. In this case, clocks such as $\phi_{ST}$ which change in horizontal or vertical blanking period can be used as reset clocks, so that a number of input/output pins can be decreased.

Embodiment 2

Figure 7:
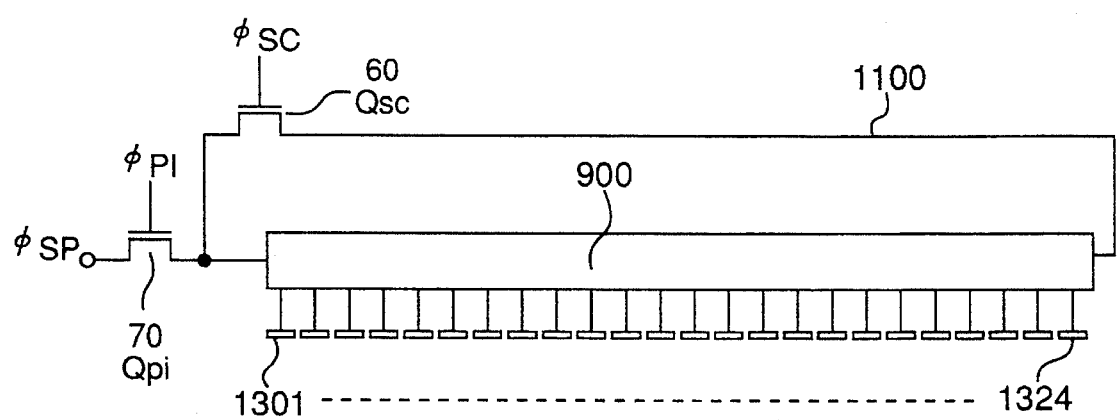
FIG. 7 is a block diagram of a vertical charge transfer element and a driving circuit therefor of a solid state image sensor of a second embodiment of the invention.

A second embodiment of the invention is explained with reference to FIGS. 7–9. FIG. 7 shows a block diagram including mainly a driving circuit 900 for the vertical charge transfer elements. In FIG. 7, the driving circuit 900 of vertical charge transfer element comprising shift registers is connected to a line 1100 for constructing a circulation loop line. AMOS transistor 60 (Qsc) is connected between the circulation loop line 1100 and an input of the driving circuit 900, while a MOS transistor 70 (Qpi) is connected between the input of the driving circuit 900 and an external clock signal $\phi_{SP}$. Clock signals $\phi_{SC}$ and $\phi_{PI}$ are supplied to gate electrodes of the MOS transistors 60 and 70.

Figure 8:
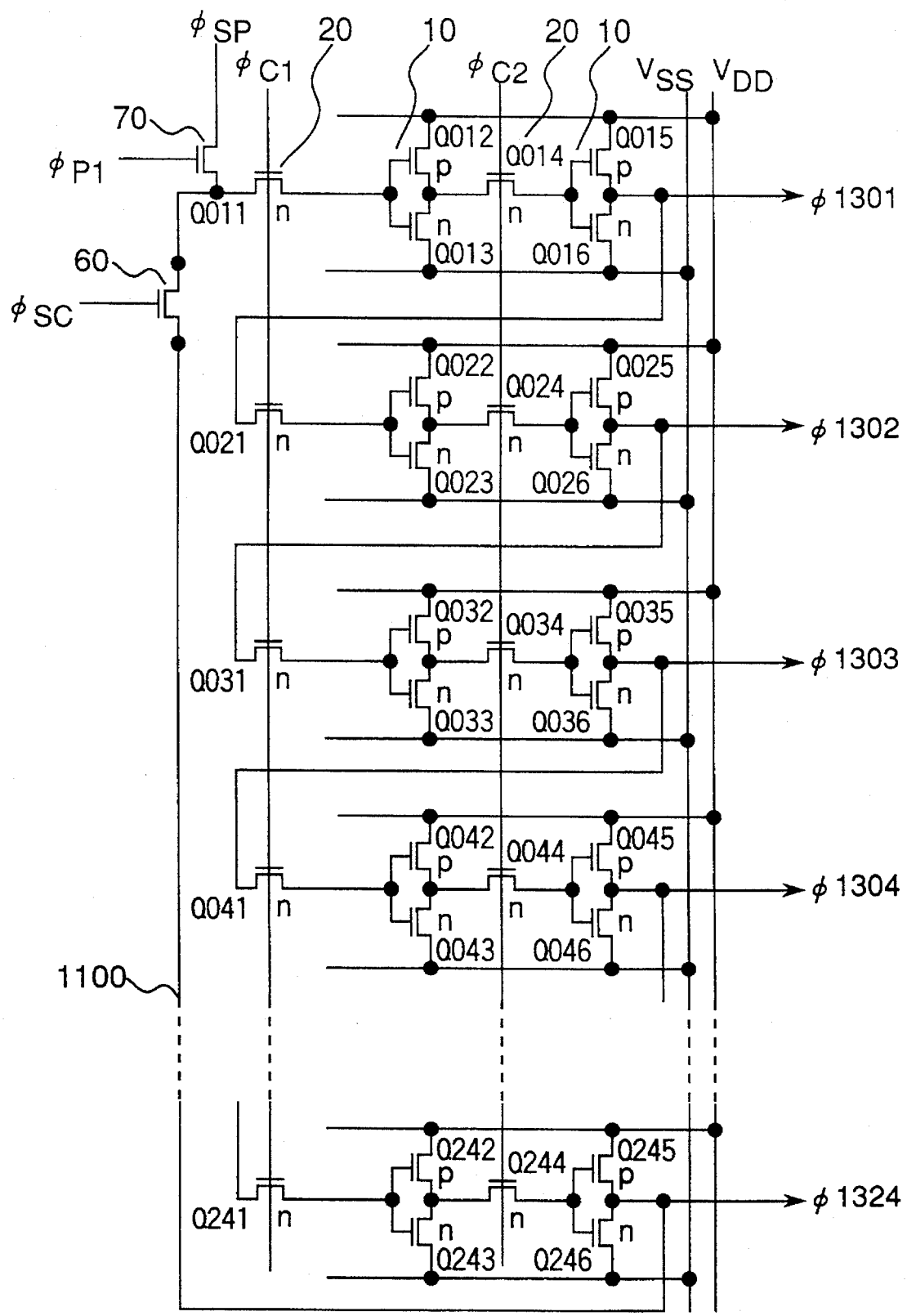
FIG. 8 is a block diagram of a driving circuit therefor of a solid state image sensor of a modified example of the second embodiment of the invention.
Figure 9:
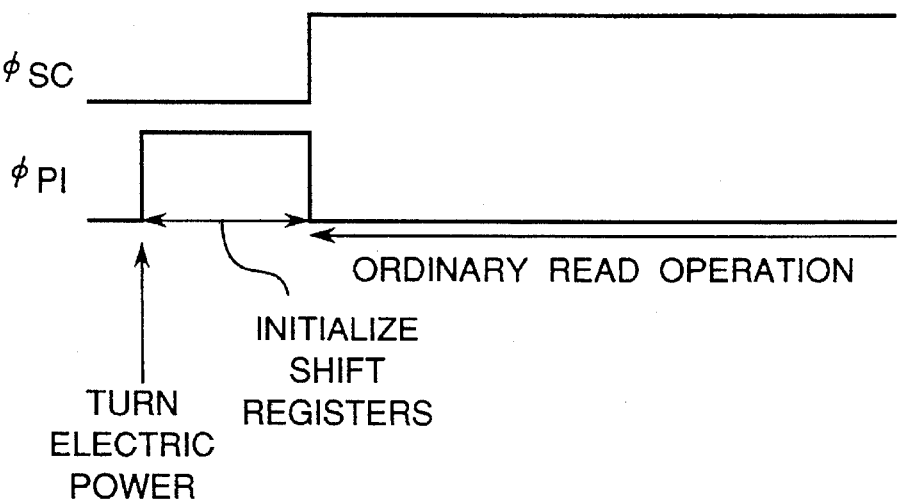
FIG. 9 is a clock timing chart for explaining the operation of the driving circuit for the vertical charge transfer element shown in FIGS., 7 and 8.

FIG. 8 shows connection of the circulation loop line 1100 and shift registers comprising CMOS transistors of the driving circuit 900. The reset transistors 40 and the clock $\phi_R$ shown in FIG. 6 are omitted, whereas switch means (or the MOS transistors controlled by clocks) are provided to the circulation loop line 1100 as shown in FIG. 7. FIG. 9 shows initial clock timings for the switch means shown in FIGS. 7 and 8.

Next, the operation of the driving circuit 900 is explained. As shown in the clock timing chart of FIG. 9, when an electric power source is turned on, clock signals $\phi_{PI}$ and $\phi_{SC}$ are set at H level and at L level, respectively, to connect the input terminal of the first stage to the external clock $\phi_{SP}$ until the image sensor starts to operate normally. At this time, the MOS transistor 60 (Qsc) is in the OFF state, and the circulation loop line 1100 is not connected by the MOS transistor 60 (Qsc). In this state, $\phi_{sc}$ is changed while the shift registers of the driving circuit 900 are operated, so as to initialize the internal state of the shift registers. The initial state is set by driving the shift registers by a number of the stages thereof. After the initial state is set, $\phi_{PI}$ and $\phi_{SC}$ are set at L level and at H level, respectively, so as to connect the circulation loop line 1100 and not to input the external clock φSP. Then, the shift registers 900 are driven, and multi-phase driving clocks are generated as in the first embodiment. Once the operation starts, the internal state is determined uniquely, or the initialization is not needed, and noises due to the external clock $\phi_{SP}$ are decreased.

In the above-mentioned embodiment, the clock φRused in the first embodiment is not needed. Though the number of clocks $\phi_{SP}$, $\phi_{PI}$ and $\phi_{SC}$ needed for the operation increases, a total number of elements decreases by the number of the reset transistors. Further, the clock pattern for initialization for driving can be changed easily by changing the external clock $\phi_{SP}$, or the driving can be changed flexibly.

Embodiment 3

Figure 10:
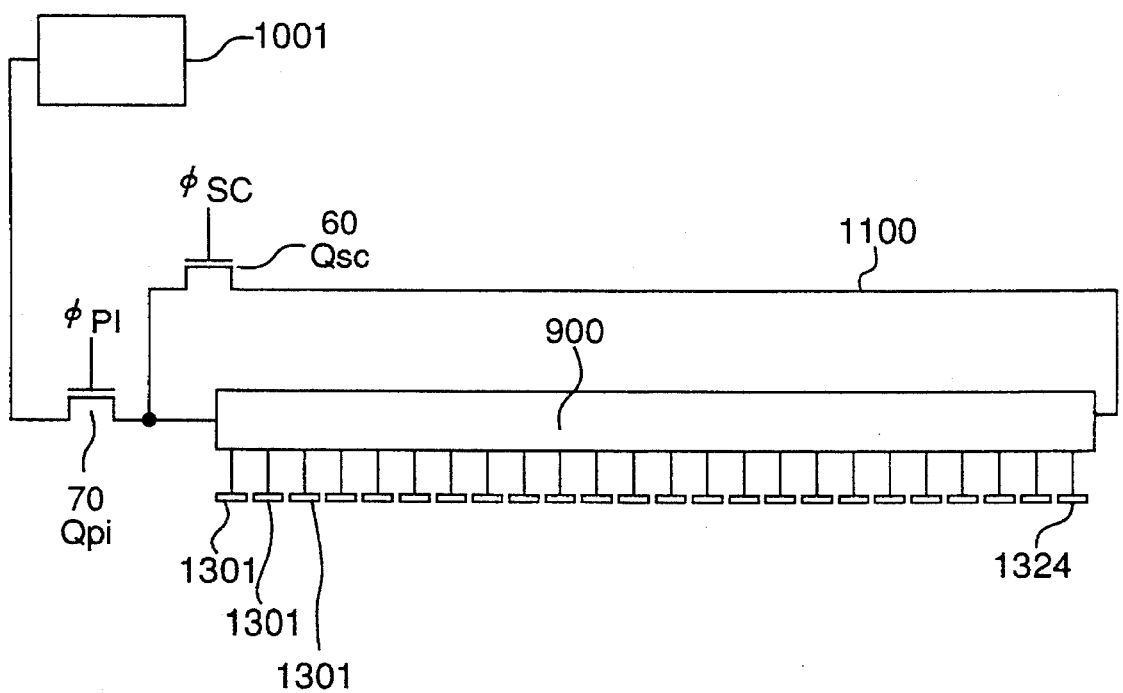
FIG. 10 is a block diagram of a vertical charge transfer element and a driving circuit therefor of a solid state image sensor of a third embodiment of the invention.

Next, a third embodiment of the invention is explained with reference to FIG. 10. In this embodiment, the external clock $\phi_{SP}$ of the second embodiment as a driving pattern of the shift registers is stored beforehand in a driving pattern memory device 1001 for the vertical charge transfer elements. When an electric power source is turned on, the shift registers of the driving circuit 900 are initialized according to the driving pattern stored in the memory device 1001. The operation after the initialization is similar to that of the second embodiment except this point.

Each stage in the second and third embodiments is constructed by the same circuit as in the first embodiment, so that a driving load of the second inverter in the last stage includes the vertical charge transfer element and the circulation loop line 1100, or a load capacity becomes large. Then, the operation as the shift register can be stabilized by increasing the channel width of the transistor of the second inverter in the last stage or by providing a buffer between the inverter and the circulation loop line 1100.

Embodiment 4

Figure 11:
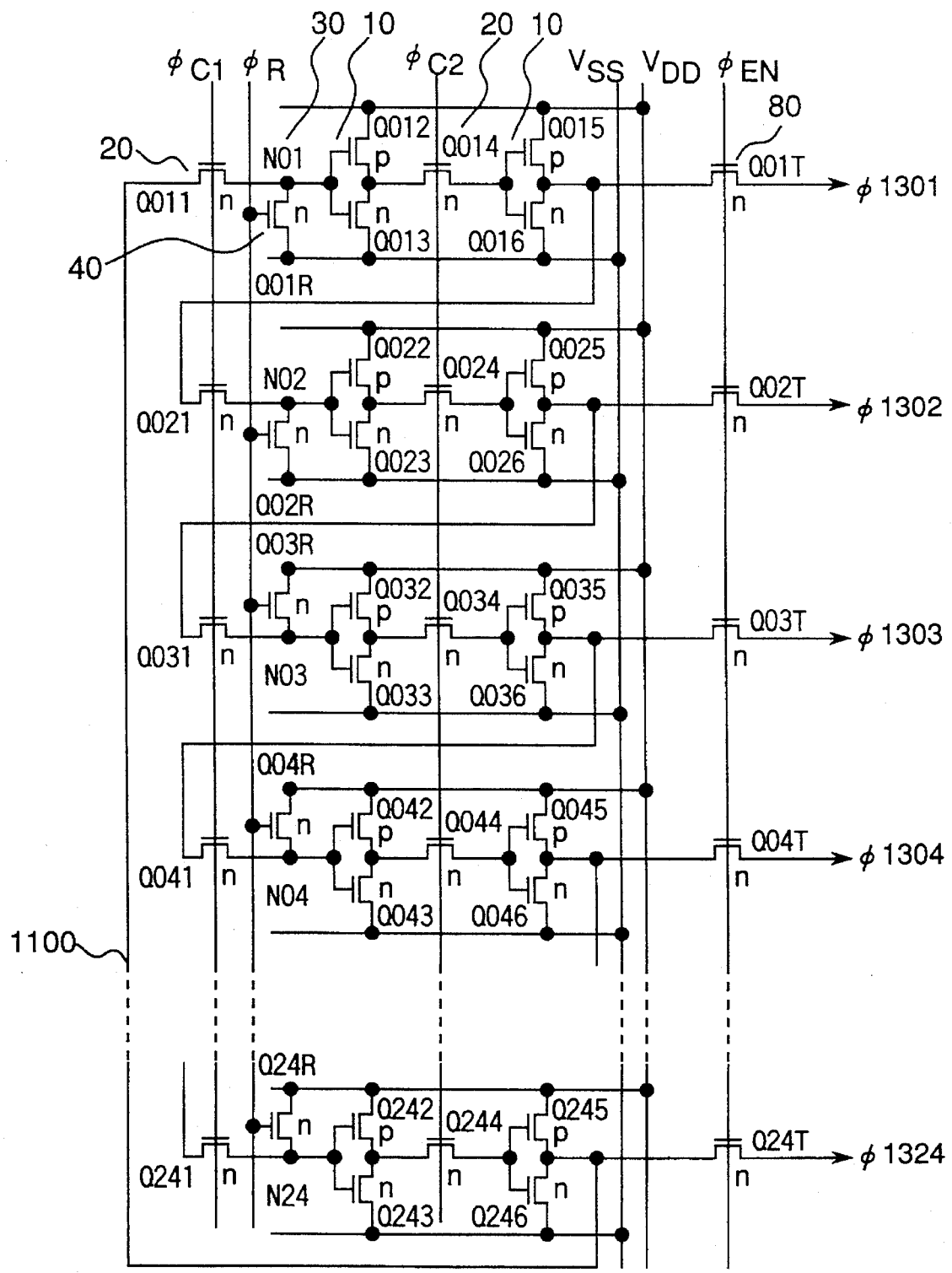
FIG. 11 is a block diagram of a driving circuit therefor of a solid state image sensor of a fourth embodiment of the invention.

Next, a fourth embodiment of the invention is explained with reference to FIG. 11 showing a circuit diagram including mainly a driving circuit 900 for the vertical charge transfer elements of the solid state image sensor of the invention. The circuit shown in FIG. 11 is similar to that shown in FIG. 6 except that transfer gates 80 (Q01T–Q24T) are provided at output portions connected to gates (not shown) of the vertical charge transfer element. In this circuit, when an external clock signal $\phi_{EN}$ connected to gate electrodes of the transfer gates 80 becomes H level, the driving circuit 900 is connected to the gate electrodes of the vertical charge transfer element, whereas when an external clock signal $\phi_{EN}$ becomes L level, the driving circuit 900 is separated electrically from the gate electrodes. Thus, by providing the transfer gates 80 at the output portions to the gate electrodes of the vertical charge transfer elements 130, 230, 330, the gate electrodes (for example 120a–120x, 220a–220x, 320a–320x in FIG. 1) of the vertical charge transfer element and as the gate electrodes (not shown) of the transfer gates in the pixels, and the selection of pixel line can be constructed as common gate electrodes, and the driving of the vertical charge transfer elements are performed with common lines with use of common clock signals.

Figure 12:
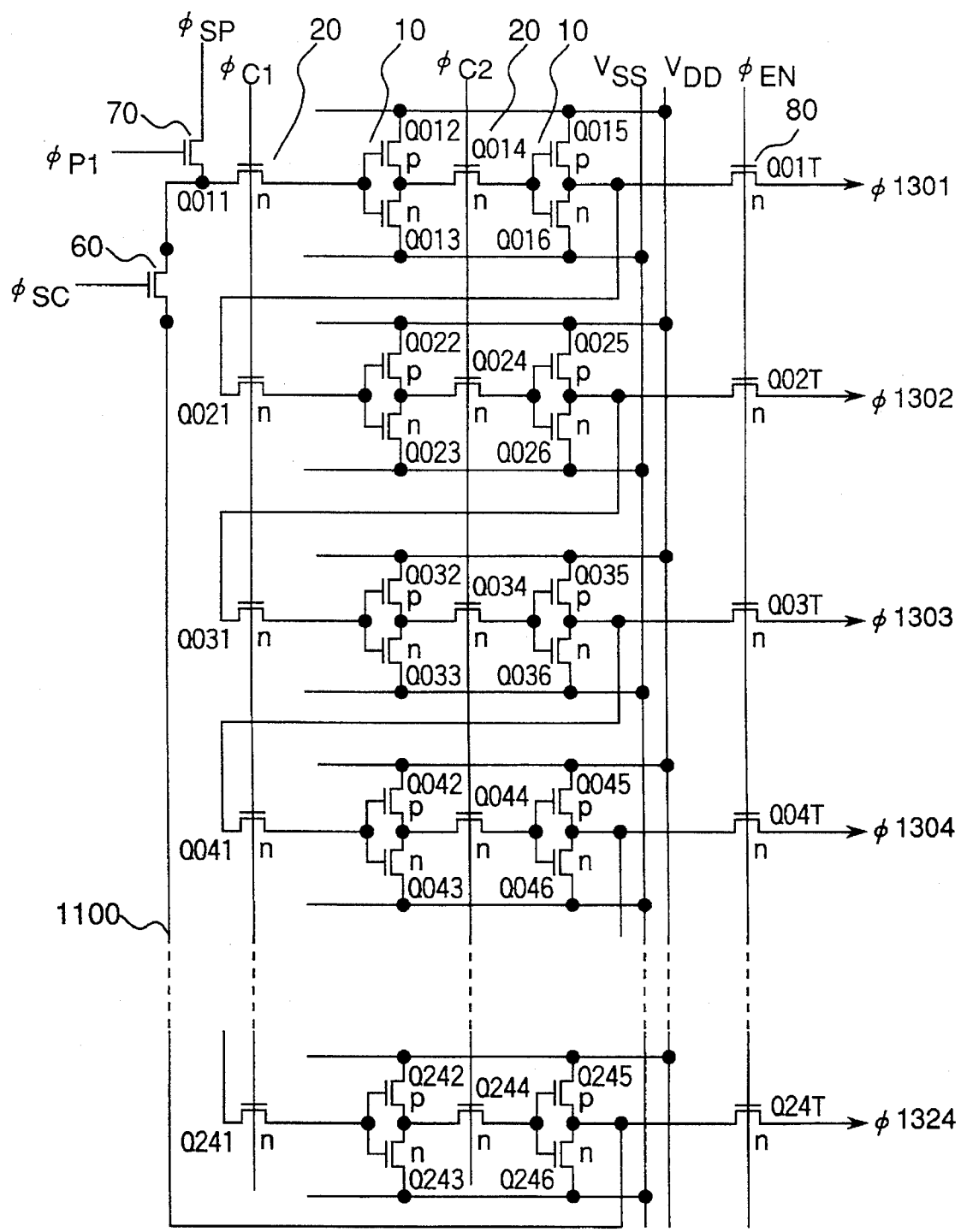
FIG. 12 is a block diagram of a driving circuit therefor of a solid state image sensor of a modified example of the fourth embodiment of the invention.

In the fourth embodiment, the transfer gates 80 are added to the driving circuit of the first embodiment. However, the transfer gates 80 may also be added to the driving circuit of the second or third embodiment. FIG. 12 shows an example where the transfer gates 80 are added to the sensor of the second embodiment. That is, transfer gates 80 (Q01T–Q24T) are provided at output portions to be connected to gates (not shown) of the vertical charge transfer element.

Embodiment 5

Figure 13:
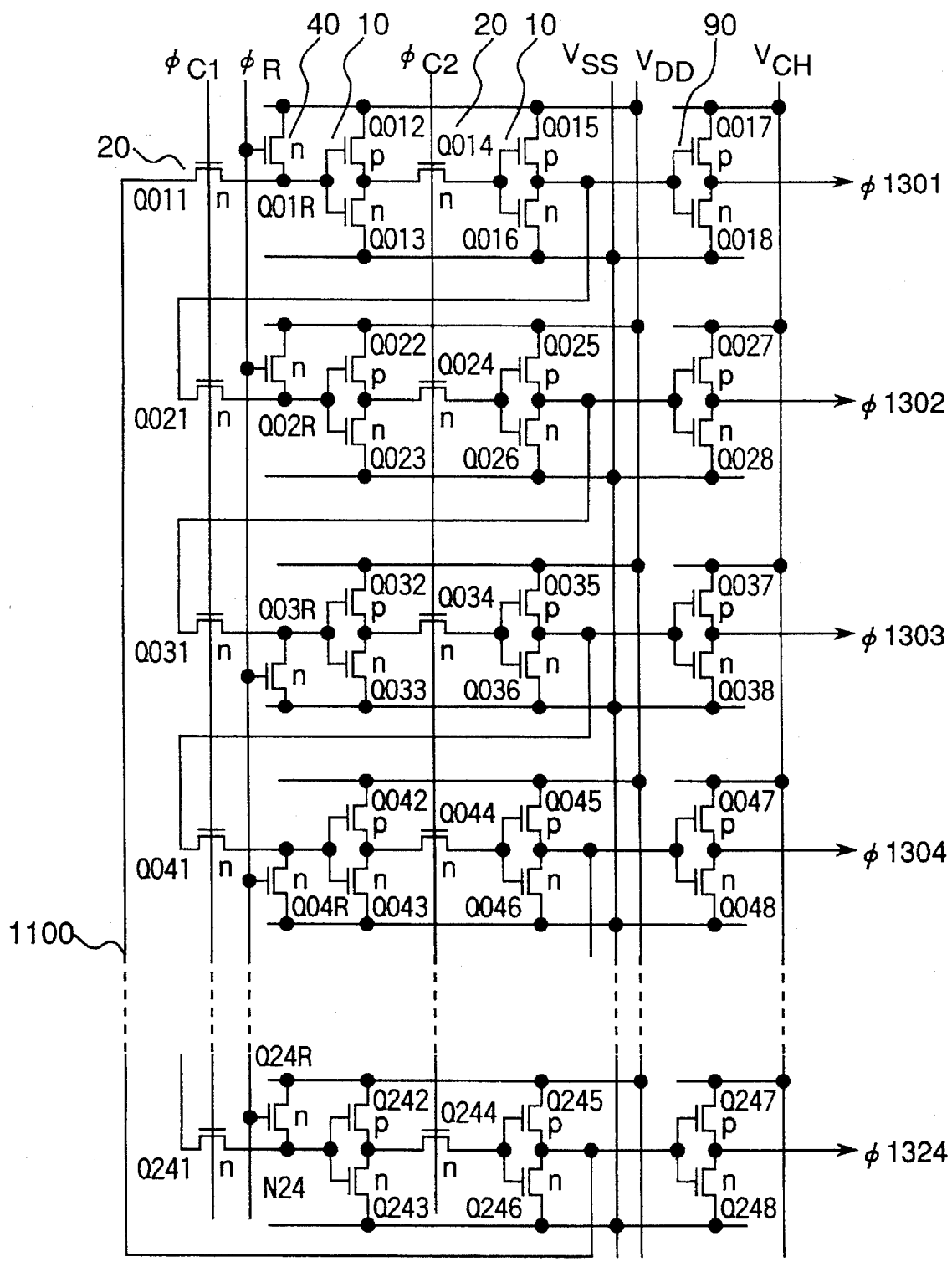
FIG. 13 is a block diagram of a driving circuit therefor of a solid state image sensor of a fifth embodiment of the invention; 10

Next, a fifth embodiment of the invention is explained with reference to FIG. 13 showing a circuit diagram including mainly a driving circuit 900 for the vertical charge transfer elements of the solid state image sensor. In FIG. 13, inverters 90 are added at output portions connected to gates of the vertical charge transfer elements in the output portions of the driving circuit 900 shown in FIG. 6 of the first embodiment, and the outputs of the shift registers are output through the inverters 90. In other words, the inverters 90 are provided instead of the transfer gates of the fourth embodiment. Further, the connection of the reset transistors is changed to output through the inverters 90. Another power supply voltage $V_{CH}$ different from the power supply voltage $V_{DD}$ for the shift registers is used for the inverters 90. A consumption power for the driving for the vertical charge transfer elements can be decreased by decreasing an electric voltage for charging and discharging for a load capacity, while a particular high voltage is needed for stable operation of the shift registers. Then, a power supply voltage for driving directly the shift registers is separated from $V_{CH}$ for driving the loads, and the latter is decreased as low as possible, to decrease the consumption power.

In the embodiment, the driver 900 comprise inverters. However, the drivers may have a circuit which supplies non-inverted output signals.

Figure 14:
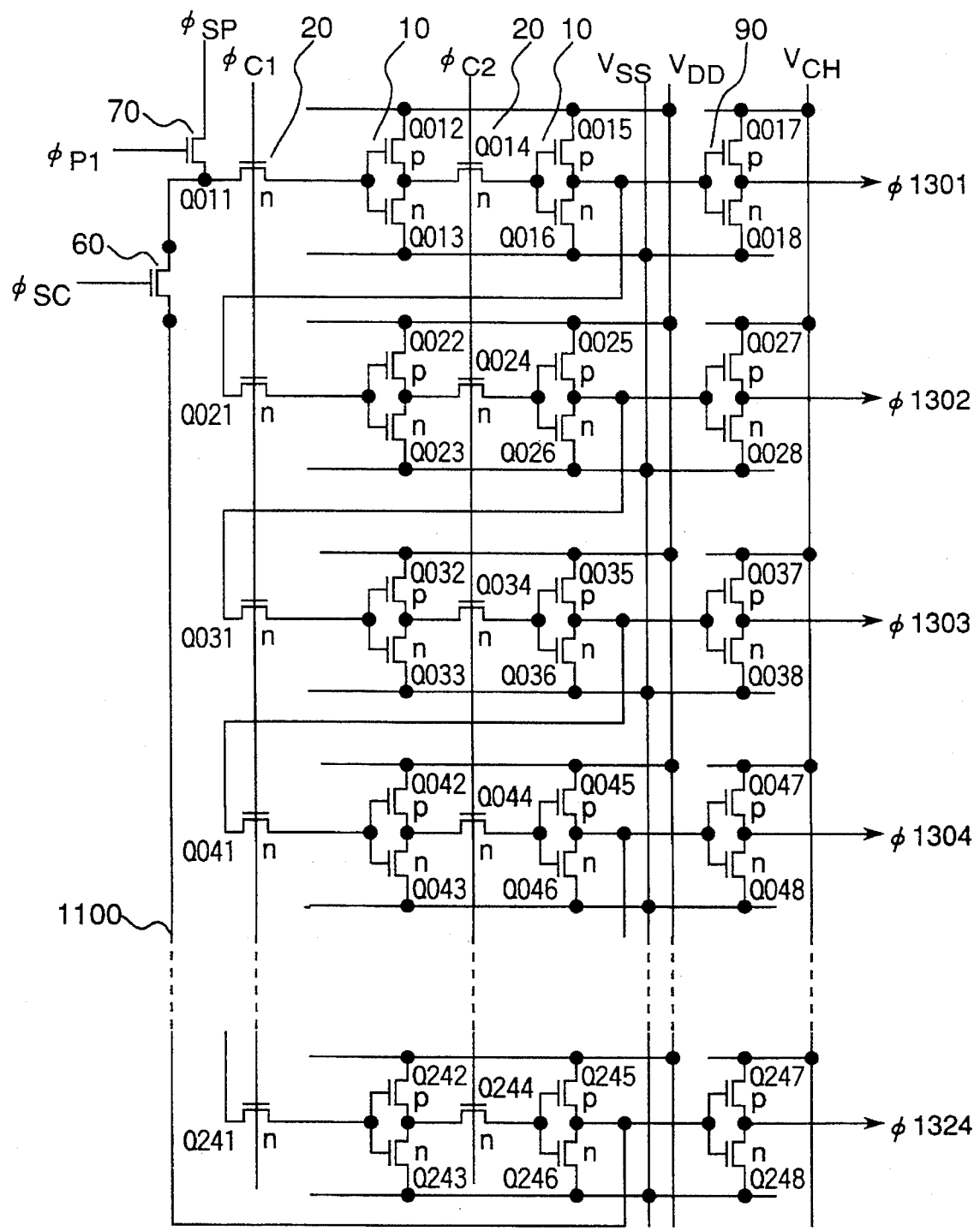
FIG. 14 is a block diagram of a driving circuit therefor of a solid state image sensor of a modified example of the fifth embodiment of the invention.

In this embodiment, the inverters 90 are added to the driving circuit of the first embodiment. However, the inverters 90 are added to the driving circuit of the second or third embodiment. FIG. 14 shows an example where the inverter 90 are added to the sensor of the second embodiment.

In this embodiment, the inverters 90 are added. However, similar advantages can be realized by adding buffers having a large driving ability.

Embodiment 6

Figure 15:
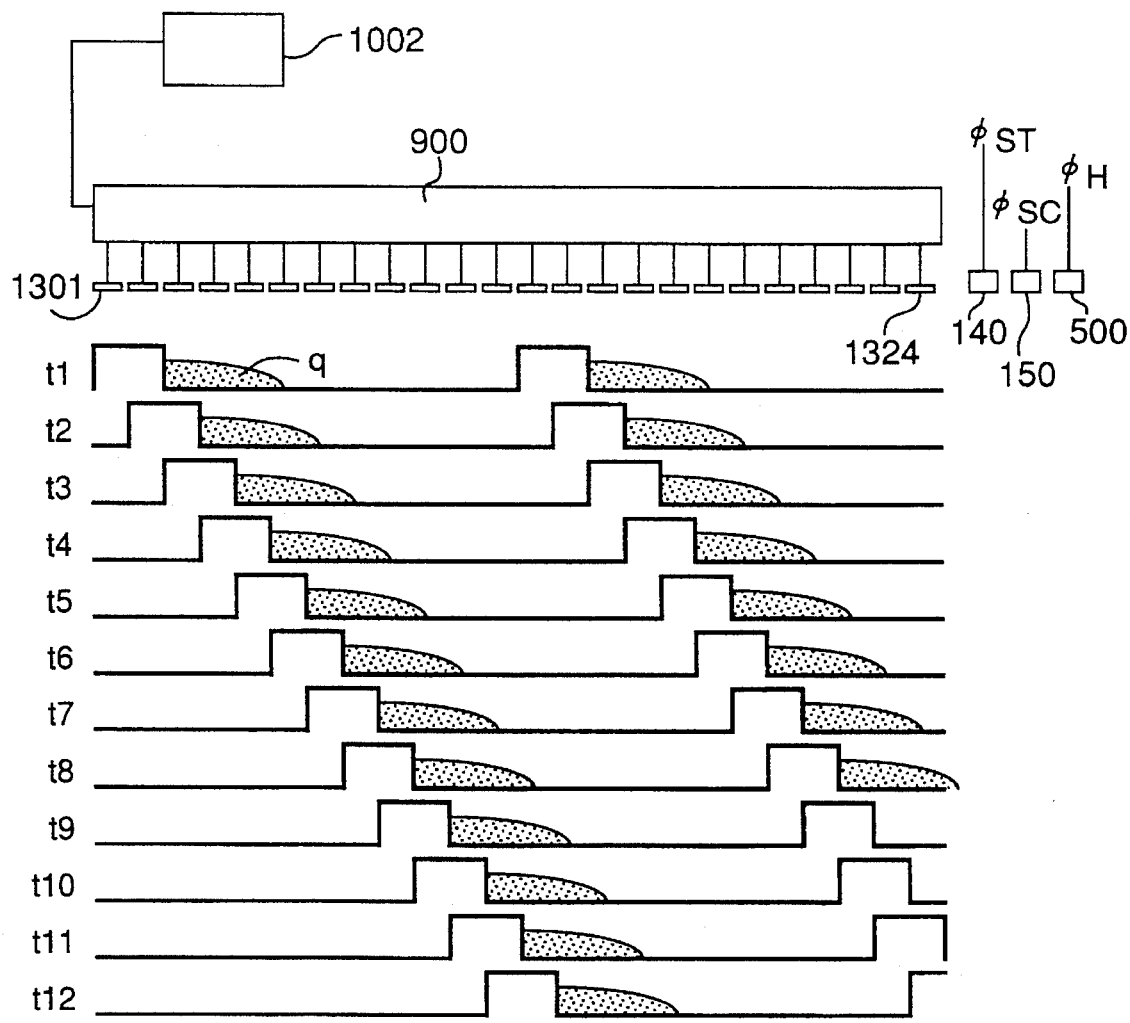
FIG. 15 is a block diagram of a driving circuit therefor of a solid state image sensor of a fifth embodiment of the invention and a channel potential diagram in a vertical charge transfer element at each timing.

Next, a sixth embodiment of the invention is explained with reference to FIG. 15 showing mainly a driving circuit 900 for vertical charge transfer elements of a solid state image sensor and a channel potential diagram in the vertical charge transfer elements at each timing. In FIG. 15, the driving circuit 900 for the vertical charge transfer gate comprises a holding circuit 1002 for holding a driving pattern for the vertical charge transfer gate for driving shift registers, instead of a circulation loop line.

In the embodiment, a driving pattern for driving the shift registers generating driving clocks of a number necessary to read signal charges for a scan of a horizontal period is stored in an external memory device 1002, instead of using a pattern through the circulation loop line repetitively as in the previous embodiments. The operation is explained below. The holding circuit 1002 supplies a clock pattern to the shift registers of the driving circuit 900 for the vertical charge transfer elements in synchronization with the driving clocks for the shift registers. For example, if a data in the holding circuit 1002 includes "HHHHHHHHHHHLLHHHHHHHH-HHLL", the channel potential changes as shown in FIG. 15 in a lower part. It is to be noted that the channel potential becomes low when the gate potential is "H" level.

First, in the initial state (or the last state in the previous cycle) denoted as t1, "H" level is input to the first stage of the shift registers of the driving circuit 900. At the next timing t2, the output of the first stage of the shift registers of the driving circuit 900 becomes "H" level, and the channel potential below the gate to which the clock signal is applied becomes deep. Then, the channel potentials change according to the inputs from the holding circuit 1002 as shown at timings t3–t11, and when "L" level is input from the holding circuit 1002, the output of the first stage of the shift registers of the driving circuit 900 becomes "L" level at timing t12, and the channel potential below the gate to which the clock signal is applied becomes shallow. At next timing t13, the state returns to the state at timing t1. In the above-mentioned scan, the signal charge is transferred by a half distance of the vertical charge transfer element. Further, as the holding circuit 1002 supplies data of an order of "HHHHHHHH-HHLL", the states at timings t2–t13 are repeated, and the signal charge is transferred to the external. In the above-mentioned operation, the transfer is performed once or by the least time. The transfer efficiency can be improved by repeating the driving, or the data held in the circuit 1002 is preferably increased. For example, if a data of "HHHHH-HHHHHLLHHHHHHHHHHHLLHHHHHHHH-HHLLHHHHHHHHHHLL" is held in the circuit 1002, the transfer can be carried out two times. By considering the transfer efficiency, the transfer of at least two times (or clock signals of a number of two times a number of the photodetectors arranged along the vertical direction) is needed actually.

The holding circuit 1002 may be a combination of a memory device and a circuit for changing an address sequentially. It may also comprise shift registers with a circuit for setting initial states.

If a clock pattern generated by the holding pattern 1002 is repeated as in the above-mentioned example, only the data of a repeated period may be stored as the data, and the data may be circulated in the holding circuit 1002 for example with a circulation loop line.

In the embodiment, a number of the shift registers of the driving circuit 900 for the vertical charge transfer element agrees with that of the photodetectors, as in an ordinary circuit. However, the shift registers may be arranged in a plurality of lines with a number for generating clocks necessary for reading signal charges for a scan of a horizontal period. The number of the shift registers to be arranged is determined according to the transfer efficiency and the transfer velocity. Signal charges are transferred precisely by repeated scanning. By taking the transfer efficiency into account, the number of the shift registers to be arranged is at least two times a number of the photodetectors arranged along the vertical direction. By providing the shift registers necessary for reading the signal charge for a scan of a horizontal period, the output is not affected by noises for a scan. By resetting in a blanking period, clocks can be generated stably.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A solid state image sensor comprising:

a photodetector array wherein photodetectors are arranged in two-dimension vertically and horizontally;

vertical charge transfer elements each connected to a line of photodetectors aligned vertically in said photodetector array;

a pixel line selection circuit which selects a horizontal line or a group of horizontal lines of photodetectors among said photodetectors in a horizontal blanking period and transfers signal charges stored in the photodetectors in the selected line or lines to the vertical charge transfer elements;

a driver means for supplying signals to said vertical charge transfer elements for driving the signal charges in said vertical charge transfer elements; and a horizontal charge transfer element connected to said vertical charge transfer elements, the horizontal charge transfer element transferring signal charges transferred from said vertical charge transfer elements to the external in a next horizontal period subsequent to the horizontal blanking period;

wherein said driver means comprises shift registers of a plurality of stages each corresponding to a horizontal line of said photodetector array; and each stage of said shift registers comprises:

transfer gates operated by clock signals and inverters connected to the transfer gates; connection lines connecting an output of the shift register in a stage to an input of the shift register in a next stage; and a circulation loop line connecting an output of the shift registers of the last stage in said shift registers to an input of the shift register of a first stage in said shift registers.

2. The solid state image sensor according to claim 1, wherein each of the shift registers of said driver circuit comprises a circuit for setting initial states of the shift registers in each stage.

3. The solid state image sensor according to claim 2, wherein each of the shift registers comprises:

a first transfer gate driven by a first clock signal;

a first inverter connected to the first transfer gate;

a second transfer gate connected to the first inverter and driven by a second clock signal; and a second inverter connected to the second transfer gate; and said circuit for setting initial states of the shift registers comprises a transistor for each shift register, a terminal of the transistor being connected to the first transfer gate and to the first inverter of the shift register, the other terminal thereof being connected to a voltage in correspondence to the initial state to be set, a gate terminal of the transistor being connected to a control signal for conduction between the two terminals.

4. The solid state image sensor according to claim 3, wherein said circuits for setting initial states for the shift registers sets one of H level voltage and L level voltage for the terminal connected to the first inverter of at least two continuous stages among the stages of the shift registers and sets the other of H level and L level voltages for the terminal for shift registers of the other stages.

5. The solid state image sensor according to claim 1, further comprising a switch means for inputting a pattern for setting the initial states of the shift registers from an external circuit, the switch means being connected between said circulation loop line and the input of the first stage of the shift register.

6. The solid state image sensor according to claim 5, wherein said switch means comprises: a first MOS transistor connected between the input of the first stage of the shift register and the external circuit; and a second MOS transistor connected between the circulation loop line and the input of the first state of the shift register for controlling a pattern input from the external circuit.

7. The solid state image sensor according to claim 6, wherein said external circuit comprises a storage device for storing the pattern.

8. The solid state image sensor according to claim 1, further comprising: inverters or buffers connected to outputs of the shift registers, the inverters or buffers having a driving ability larger than the first and second inverters provided in the shift registers, said inverters or buffers providing signals to said vertical charge transfer elements for transferring signal charge along the vertical charge transfer elements.

9. The solid state image sensor according to claim 1, further comprising: other transfer gates connected to outputs of the shift registers, the other transfer gates providing signals to said vertical charge transfer elements for transferring signal charge along the vertical charge transfer elements.

10. The solid state image sensor according to claim 1, wherein a driving ability of an inverter arranged in the shift register of the last stage connected to an input of the shift register of the first stage by said circulation loop line is larger than a counterpart inverter arranged in the last stage in each of the shift registers of the other stages.

11. The solid state image sensor according to claim 1, wherein the shift register in the last stage comprises a buffer connected after an inverter arranged in the last stage in the shift register, the buffer having a driving ability larger than the inverter arranged in the last stage in the shift register.

12. The solid state image sensor according to claim 3, further comprising:

third transfer gates connected to outputs of the shift registers, the third transfer gates providing signals to said vertical charge transfer elements for transferring signal charge along the vertical charge transfer elements.

13. The solid state image sensor according to claim 5, further comprising: transfer gates connected to outputs of the shift registers, the transfer gates providing signals to said vertical charge transfer elements for transferring signal charge along the vertical charge transfer elements.

14. A solid state image sensor comprising;

a photodetector array wherein photodetectors are arranged in two-dimension vertically and horizontally;

vertical charge transfer elements each connected to a line of photodetectors aligned vertically in said photodetectors array;

a pixel line selection circuit which selects a horizontal line or a group of horizontal lines of photodetectors among said photodetectors in a horizontal blanking period and transfers signal charges stored in the photodetectors in the selected line or lines to the vertical charge transfer elements;

a driver means for supplying signals to said vertical charge transfer elements for driving the signal charges in said vertical charge transfer elements; and a horizontal charge transfer element connected to said vertical charge transfer elements, the horizontal charge transfer element transferring signal charges transferred from said vertical charge transfer elements to the external in a next horizontal period subsequent to the horizontal blanking period;

wherein said driver means comprises shift registers of a plurality of stages each corresponding to a horizontal line of said photodetector array; and each stage of said shift registers comprises: transfer gate operated by clock signal and inverters connected to the transfer gates; and a means for generating clock signals for driving said vertical charge transfer elements, the clock signals being of a circulating clock pattern and of a number necessary to read signal charges stored in two-dimension in a horizontal period, the number being at least twice a number of the photodetectors arranged vertically.

15. The solid state image sensor according to claim 14, wherein said means for generating clock signals comprises a storage device and shift registers driven according to a driving pattern stored in the storage device.

16. The solid state image sensor according to claim 14, wherein a number of the shift register being a number necessary to read a scan line of signal charges stored in two-dimension in a horizontal period, the number being at least twice a number of the photodetectors arranged vertically.

17. A method for driving a solid state image sensor comprising: a photodetector array wherein photodetectors are arranged in two-dimension vertically and horizontally; vertical charge transfer elements each connected to a line of photodetectors aligned vertically in said photodetector array; a pixel line selection circuit which selects a horizontal line or a group of horizontal lines of photodetectors among said photodetectors in a horizontal blanking period and transfers signal charges stored in the photodetectors in the selected line or lines to the vertical charge transfer elements; a driver means for supplying signals to said vertical charge transfer elements for driving the signal charges in said vertical charge transfer elements; and a horizontal charge transfer element connected to said vertical charge transfer elements, the horizontal charge transfer element transferring signal charges transferred from said vertical charge transfer elements to the external in a next horizontal period subsequent to the horizontal blanking period; wherein said driver means comprises shift registers of a plurality of stages each corresponding to a horizontal line of said photodetector array; and each stage of said shift registers comprises: transfer gates operated by clock signals and inverters connected to the transfer gates; connection lines connecting an output of the shift register in a next stage; and a circulation loop line connecting an output of the shift registers of the last stage in said shift registers to an input of the shift register of a first stage in said shift registers; the method comprises:

a first step of resetting an input stage of the shift registers of each stage in the vertical charges transfer elements by external clocks at predetermined electrical potentials;

a second step of providing outputs of the shift registers to the vertical charge transfer elements for transfer signal charge along the vertical charge transfer elements; and a third step of inputting the output of the shift register of a stage to an input of the shift register at a next stage and inputting the output of the shift register of the last stage to an input of the shift register at the first stage;

wherein the second and third steps are iterated.

18. The method according to claim 17, wherein said first step is performed in a time when an electric power is turned on, in a vertical blanking period, or in a horizontal blanking period.

19. The method according to claim 17, wherein the electrical potential reset in the shift registers of at least two successive stages is different from that reset in the other stages.

20. The method according to claim 17, wherein in the second step, one of the outputs of the inverters of the shift registers of each stage is input to the gate of the vertical charge transfer element, and the transfer gate is turned off when said pixel line selection circuit is operated.

* * * * *